3,270,045
DIPHENYL METHYLENE-MALONONITRILE
COMPOUNDS
Albert F. Strobel, Delmar, and Sigmund C. Catino, Castleton, N.Y., assignors to General Aniline & Film Corporation, New York, N.Y., a corporation of Delaware
No Drawing. Filed Mar. 23, 1961, Ser. No. 97,754
13 Claims. (Cl. 260—465)

This invention relates to new and useful derivatives of diphenylmethylenemalononitrile and for processes for preparing same.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importane relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered a class of compounds which are not only compatible with a great number of film-forming plastics, resins, gums, waxes and the like, but which, further, exhibit outstanding ultra-violet absorbing properties within the generally encountered ultra-violet region of 250 to 400 millimicrons. The compounds of this invention are particularly outstanding in that the ultra-violet absorbing characteristics thereof may be varied such that any particular region within the aforementioned ultra-violet spectrum may be covered by mass absorption characteristics leaving the remainder of this spectrum to be transmitted. Thus, by the proper selection of substituents it is possible to obtain compounds which have outstanding absorption characteristics in the far end of the spectrum, that is, from about 250 to 300 millimicrons. By the use of other selected substituents, it is possible to obtain almost complete absorption of other bands. Thus, maximum absorption may be obtained closer to the visible, that is, between about 3200 to 3600–3800 A. Thus compounds of this invention which exhibit outstanding ultra-violet absorbing properties close to the visible region of the spectrum nevertheless are essentially colorless compounds and can be employed with the assurance that they will not contribute to color in normally colorless formations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful derivatives of diphenylmethylenemalononitrile.

It is still further object of this invention to provide new and useful derivatives of diphenylmethylenemalononitrile exhibiting outstanding ultra-violet absorbing properties.

It is another object of this invention to provide processes for the preparation of new and useful ultra-violet absorbing compositions.

It is still another object of this invention to provide processes for the preparation of new and useful derivatives of diphenylmethylenemalononitrile.

Other objects and advantages will appear hereinafter as the description proceeds.

The new and useful compounds of this invention are characterized by the following general formula:

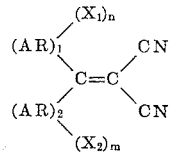

wherein $(AR)_1$ and $(AR)_2$ represent aromatic carboxylic nuclei devoid of nitro substituents and nuclear bonded amino groups and more particularly and preferably, $(AR)_1$ and $(AR)_2$ represent phenyl rings, and wherein at least one of the substituents $X_1$ and $X_2$ is halogen such as fluoro, chloro, bromo or iodo; hydroxy; alkoxy such as methoxy, ethoxy, propoxy, butoxy, amyloxy, decyloxy, octadecyloxy, and the like; carboxy; carbonamido; sulfonamido; cyano; carbalkoxy; acyloxy, e.g., acetoxy, propionoxy, butyroxy, valeroxy; and monocyclic, carbocyclic, aryl and substituted aryl devoid of nitro and nuclear bonded amino groups, e.g., phenyl, tolyl, xenyl, halophenyl, cyanophenyl, carboxyphenyl, hydroxyphenyl, hydroxyphenylesters, hydroxyphenylethers, methoxyphenyl, ethoxyphenyl, phenoxy, toloxy, xyloxy, benzoxy, toluoxy, phenylacetoxy, and the like, and $n$ and $m$ are integers from 0 to 5, and $n+m$ is at least 1. In addition, alkyl substituents may also be present. Among the monocyclic carbocyclic substituted aryls, mention may be made of:

chlorophenyl
bromophenyl
carbomethoxyphenyl
carbethoxyphenyl
carboethoxyphenyl
acetoxyphenyl
sulfamylphenyl
N',N-dimethylsulfamylphenyl
carboxamidophenyl
N,N-dimethylcarboxamidophenyl, etc.

Among the carbalkoxy substituents, mention may be made of:

carbomethoxy
carboethoxy
carbopropoxy
carbobutoxy, etc.

Among the specific benzophenone compounds which may be employed in the preparation of the compounds of this invention are the following:

2-chlorobenzophenone
2-fluorobenzophenone
3-fluorobenzophenone
3-chloro-2-hydroxy-5-methylbenzophenone
4'-chloro-3-methoxybenzophenone
2-chloro-4'-methylbenzophenone
2-chloro-4'-phenylbenzophenone
4'-chloro-2,4,6-trimethylbenzophenone
5,5'-dibromo-2,2'-dimethoxybenzophenone
2-hydroxy-4-methylbenzophenone
2-hydroxy-5-methylbenzophenone
4-hydroxy-2-methylbenzophenone
4-hydroxy-3-methylbenzophenone
2-methoxy-5-methylbenzophenone
4-methoxy-4'-methylbenzophenone
2,6-dimethoxy-3'-methylbenzophenone
2,5-dimethoxy-3,4-dimethylbenzophenone
4,4'-dimethoxy-3,3'-dimethylbenzophenone
4-octylbenzophenone
2,3,4,5,6-pentachlorobenzophenone
2,4,6-trimethyl-2',6'-diphenylbenzophenone
5,5'-dibromo-2,2',4,4'-tetramethoxybenzophenone
3,5-dichloro-2,2',4',6-tetramethoxybenzophenone
3',5'-dichloro-4'-hydroxy-2,4,6-trimethylbenzophenone
2,5-dimethyl-3,4-diphenylbenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzophenone
benzophenone carboxylic acid (2)
benzophenone carboxylic acid (3)
benzophenone carboxylic acid (4)
2-benzoyl benzoic acid methyl ester
2-benzoyl benzoic acid ethyl ester
2-benzoyl benzoic acid amide
2-benzoyl benzoic acid monoethyl amide
3-benzoyl benzoic acid methyl ester
3-benzoyl benzoic acid ethyl ester
4-benzoyl benzoic acid methyl ester
4-benzoyl benzoic acid ethyl ester
2-sulfamido benzophenone
4-sulfamido benzophenone
2-phenyl benzophenone
2-benzoyl benzophenone
4,4'-di-p-toluyl benzophenone
3-phenyl benzophenone
4-phenyl benzophenone
N,N-dimethyl-2-sulfonamido benzophenone
2-carboxamido benzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)-benzophenone
4-(p-tolyloxy)-benzophenone
2-acetoxybenzophenone
4-isopentyloxybenzophenone
3-acetoxybenzophenone
4-acetoxybenzophenone
4-cyclohexyloxybenzophenone
4-benzyloxybenzophenone
2,4'-difluorobenzophenone
4,4'-difluorobenzophenone
2,4-dibromobenzophenone
2,6-dibromobenzophenone
2,2'-dibromobenzophenone
2,4'-dibromobenzophenone
3,3'-dibromobenzophenone
4,4'-dibromobenzophenone
4,4'-dichlorobenzophenone
2,4-dichlorobenzophenone
2,4'-dichlorobenzophenone
3,4-dichlorobenzophenone
4,4'-diiodobenzophenone
3,5-diiodobenzophenone
4-chloro-4'-bromobenzophenone
2,2'-diiodobenzophenone
2,4,6-tribromobenzophenone
2,4,6-trichlorobenzophenone
2,5,2',5'-tetrachlorobenzophenone
2,4,2',4'-tetrachlorobenzophenone
2-bromo-4'-phenylbenzophenone
2-chloro-4'-phenylbenzophenone
4(p-methoxyphenyl)-4'-phenylbenzophenone
4(p-hydroxyphenyl)-benzophenone
3-chloro-4(2-hydroxyethoxy)-benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4'-bromo-4-hydroxybenzophenone
4-bromo-4-ethoxybenzophenone
3-iodo-4-methoxybenzophenone
3-iodo-4-hydroxybenzophenone
4'-iodo-4-ethoxybenzophenone
2-chloro-2'-bromo-4-hydroxybenzophenone
3,5-dibromo-4-hydroxybenzophenone
3,5-diiodo-4-hydroxybenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
2,2'-dihydroxy-4,4'-dipropoxybenzophenone
3,3'-dimethoxy-4,4'-bis(benzyloxy)-benzophenone In addition to the above contemplated derivatives, polyoxyalkylated derivatives of those compounds containing at least one reactive hydrogen atom are within the purview of this invention. From the compounds herein contemplated, the reactive hydrogen containing compounds are the phenols and amides. There are reacted with the alkylene oxide or a compound functioning as an oxide such as ethylene oxide, propylene oxide, butylene oxide, butylene dioxide, cyclohexane oxide, glycidol, epichlorohydrazin, butadiene dioxide, isobutylene oxide, styrene oxide and mixtures thereof, and the like, to yield the corresponding polyoxyalkylated product. The resultant phenolic derivatives, e.g., have the following general formula:

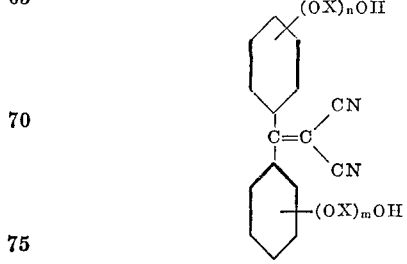

wherein X represents the hydrocarbon residue of the oxyalkylating agent, for example, ethylene (from ethylene oxide and epichlorohydrin), propylene (from propylene oxide), etc. and $n$ and $m$ are integers from 0 to about 100 except that at least one of these is at least 1 and wherein $n$ and $m$ represent the moles of oxyalkylating agent condensed with the phenol.

The general process for the preparation of the compounds of Formula I is well known and involves a condensation of the substituted benzophenone with malononitrile in a suitable solvent under such conditions that dehydration occurs to form the substituted ethylene. The following examples will serve to illustrate the preparation and application of the compositions contemplated in the present invention without being deemed limitative thereof.

*Example 1*

Preparation and application of 4,4'-dichlorodiphenylmethylenemalononitrile to cellulose acetate film;

4,4'-dichlorobenzophenone is condensed with malononitrile as follows:

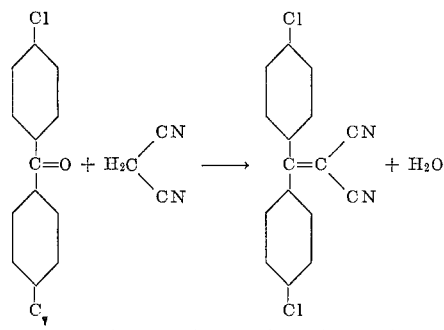

Into a 500 ml. flask fitted with stirrer, thermometer, reflux condenser, water trap and heating mantle there is charged:

| | |
|---|---|
| Malononitrile (0.25 mole), gms. | 16.5 |
| 4,4'-dichlorobenzophenone (0.25 mole), gms. | 62.75 |
| Ammonium acetate, gms. | 3.85 |
| Glacial acetic acid, ccs. | 12 |
| Benzene, mls. | 75 |

The charge is stirred 12 hours at reflux. The benzene is distilled off, the residue diluted with 150 mls. water and filtered. The lumps are crushed in a mortar. The solid is slurried in 100 mls. water and filtered. The cake is washed on the funnel with 200 mls. water. The product is air dried. It is distilled at 0.5 mm. at 185°–200° C. The 18.5 g. material remaining is recrystallized from 150 mls. ethanol plus 300 mls. water after nucharing.

Incorporation of this material into cellulose acetate is carried out as follows:

| | Gms. |
|---|---|
| 4,4'-dichlorodiphenylmethylenemalononitrile | 0.375 |
| Ethanol | 3.5 |
| Methyl Cellosolve | 6.5 |
| Ethyl acetate | 9.0 |
| Cellulose acetate dope (consisting of 3.75 gms. cellulose acetate in 21 gms. acetone) | 26 | are mixed with stirring until a clear solution is obtained. The material was poured into a mold and the solvent evaporated to give a block of cast material ⅛" thickness. A similar block was prepared in the same fashion and omitting the 4,4'-dichlorodiphenylmethylmalononitrile. The material containing the ultraviolet absorber gave better stability to light exposure to food stored behind it than the case block without the ultraviolet absorber.

*Example 2*

Preparation and application of phenyl-4-n-dodecyloxyphenylmethylenemalononitrile in polyethylene:

4-n-dodecyloxybenzophenone (prepared as described below) is condensed with malononitrile in the manner described above for the condensation of 4,4'-dichlorobenzophenone with malononitrile. The 4-n-dodecyloxybenzophenone is prepared by alkylation of 4-hydroxybenzophenone with n-dodecyliodide as follows:

300 mls. of n-butyl alcohol and 4.0 gms. of sodium hydroxide pellets are mixed and after agitation for 1 hour 19.8 gms. 4-hydroxybenzophenone (0.1 mole) are added. 44.2 gms. (=0.15 mole) of 1-iodo-n-dodecane are then added. The charge is stirred 15 hours at 68° C., cooled to room temperature, and diluted to 1 liter volume with methanol. There is added 1.5 mls. of sodium hydroxide (30%) bringing the material to phenolphthalein alkalinity. The material is filtered to give 4-n-dodecyloxybenzophenone.

Application of phenyl-(4-n-dodecyloxyphenyl)-methylenemalononitrile to polyethylene is carried out as follows:

| | Gms. |
|---|---|
| Of the above ultraviolet light absorber | 0.5 |
| Polyethylene wax PT 95504 (Semet-Solvay) | 99.5 | are melted at 120° C. to give a solution. The material is then pressed out in a Carver press to give a film of about ⅛" thickness. Meat stored behind the film containing absorber is less discolored on exposure to light than meat behind similar film prepared without absorber.

*Example 3*

Preparation and application of 4-chlorophenyl-4'-methoxyphenylmethylenemalononitrile to furniture polish:

4-chloro-4'-methoxybenzophenone is condensed with malononitrile in the manner described for 4,4'-dichlorobenzophenone in Example 1.

A melt is made on a steam bath of:

| | |
|---|---|
| Carnauba wax, oz. | 9 |
| Turpentine, pints | 1.5 |
| Pints hot water containing 2 oz. soap | 1.75 |

The whole mixture is beaten to an emulsion with a Waring Blendor. A similar formation is made containing 2% of the weight of carnauba wax of the ultraviolet absorber. 4 - chlorophenyl-4'-methoxyphenylmethylenemalononitrile.

The formulation containing the ultraviolet absorber when applied to stained and varnished oak give better protection against discoloration (darkening) by light than the formulation free of absorber.

*Example 4*

Preparation and application of 2,4'-dichlorodiphenylmethylenemalononitrile to polyester film:

2,4'-dichlorodiphenylenemalononitrile is made from 2,4'-dichlorobenzophenone and malononitrile as described in Example 1. Application of this material to polyester resin (Mylar) is carried out as follows:

0.25 gm. of the ultraviolet light absorber is dissolved in 100 gms. of Polylite 8000 containing 1% Luperco ATC. A casting is made between opal glass plates treated with mold release agent (Dri-Film SC–87). As gasket material Tygon tubing is placed between the plates and the latter are clamped together. The polyester is poured into the mold and cured as follows:

Initial oven temperature —65° C. The temperature is raised slowly to 90° C. and the material is held at this temperature 1 hour. The temperature is then raised to 120° C. and held ½ hour to complete the curing cycle. The material is cut to size. The polyester mold made in this way gives better protection against sunlight to fruit and meat stored behind it when containing ultraviolet absorber than a casting prepared in similar fashion but free of ultraviolet absorber.

*Example 5*

Application of phenyl-(4-methoxyphenyl)-methylenemalononitrile to methacrylate ester polymers on leather:

In a 1 quart small neck liquid bottle was added 160 gms. methylacrylate, 1.7 gms. phenyl-4-(methoxyphenyl)- methylenemalononitrile, 20 gms. Triton X–200, 0.3 gm. ammonium persulfate, and 176 gms. water.

The above mixture was shaken to a uniform emulsion (a white milk-like liquid), then gradually poured into 500 mls. water over a 2½ hour period. The material was refluxed 3 hours.

This product was then sprayed on leather. The leather was pressed between plates and dried. Leather treated with this formulation showed less tendency toward yellowing than leather treated with a similar formulation omitting the ultraviolet absorber.

*Example 6*

Preparation of di(4-hydroxyphenyl)methylenemalononitrile:

This compound is prepared by the condensation of malononitrile with 4,4'-dihydroxybenzophenone in the manner described in Example 1 employing equimolecular amounts of reactants as shown in that example.

*Examples 7–20*

In the following examples equimolecular amounts of malononitrile and the indicated benzophenone compounds are condensed in the manner described in Example 1:

Example: Benzophenone compound
7 .......... 4-phenylbenzophenone
8 .......... 4,4'-dimethoxybenzophenone
9 .......... 4,4'-dibromobenzophenone
10 .......... 4-hydroxybenzophenone
11 .......... 3,4-dimethyl-4'-ethoxybenzophenone
12 .......... 4,4'-diethoxybenzophenone
13 .......... 2,3,4,5,6-pentachlorobenzophenone
14 .......... 3',5'-dichloro-4'-hydroxy-2,4,6-trimethylbenzophenone
15 .......... 3,5-dichloro-2,2',4',6-tetramethoxy-4-methylbenzophenone
16 .......... 2-sulfamidobenzophenone
17 .......... 2-benzoylbenzophenone
18 .......... 4-cyanobenzophenone
19 .......... 2-carboxamidobenzophenone
20 .......... 3-acetoxybenzophenone In addition to the compounds exemplified above, it is within the purview of this invention to include numerous other derivatives of such compounds such as the polyoxyalkylated derivatives of the hydroxyl and amido compounds as well as esters of the hydroxylated compounds. The latter is illustrated in the following example.

*Example 21*

The bis-hydroxy compound of Example 6 is converted to the benzene sulfonyl bis-ester in the following manner. 1 mole of di-(4-hydroxyphenyl)-methylenemalononitrile is dissolved in 4 moles of pyridine. The mixture is maintained at about 10° C. At this temperature there is slowly added 1.1 moles of benzene sulfonyl chloride over a period of 15 minutes. The mixture is then heated gently at 50° C. for 35 minutes, allowed to cool to room temperature, and then drowned in ice water containing sufficient hydrochloric acid to neutralize the pyridine. The resultant precipitate is the bis-benzenesulfonate ester. The material is purified by recrystallization from an aqueous methanol medium containing equal parts of alcohol and water.

The following examples illustrate the preparation of numerous polyoxyalkylated derivatives which are herein contemplated.

*Example 22*

To 1 mole of phenyl-4-hydroxyphenylmethylenemalononitrile containing 1% by weight based on the weight of the phenol of potassium hydroxide there are added 6 moles of ethylene oxide while maintaining the mixture in an autoclave at 80° C. during the addition of the ethylene oxide. The resultant product disperses readily in water and may be used to treat hydrophilic materials such as paper and other cellulosic products such as cotton, jute, and the like. This polyoxyalkylated product is also an excellent dispersing agent for pigments and dyestuffs, and when used in combination with these materials, it affords outstanding protection against ultra-violet light degradation.

*Example 23*

The procedure of Example 22 is repeated except that 30 moles of ethylene oxide are reacted with the hydroxyl group of the malononitrile. The resultant product has excellent surface active properties, and may be employed in the preparation of oil-in-water and water-in-oil emulsions which are characterized not only by excellent stability due to the surface active properties of the resultant condensate, but also stability against degradation by ultraviolet light.

*Example 24*

The bis-hydroxy compound of Example 6 is treated with ethylene oxide in the manner described in Example 22 to yield a product containing 12 moles of ethylene oxide per mole of malononitrile compound. The product is an excellent emulsifier and may be employed in hydrophilic systems to afford protection against ultra-violet light degradation.

*Example 25*

The previous example is repeated to produce a product containing 35 moles of ethylene oxide per mole of malononitrile. This product is particularly outstanding for use with soap and detergent products to afford them protection against degradation by ultra-violet light.

The compounds of this invention are in general soluble in a great variety of solvents, plastics, resins, waxes and the like, and therefore are particularly adaptable for the stabilization of a great variety of different types of organic materials. The non-oxylkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers of this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds of this invention give outstanding protection to paint, enamel and varnish films against fading of pigments and dyes contained therein. The most outstanding and significant achievement of the compounds of this invention lies in the remarkable ability of these compounds to protect and stabilize polyoxymethylene and nitrocellulose containing compositions against ultra-violet light degradation. The compounds of this invention have been found to be at least five times as effective in such stabilizing situations as the heretofore employed hydroxybenzophenones known for such uses.

The compounds of the present invention have also been found to be admirably suited for incorporation into the transparent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Example 1. For direct incorporation into a film of regenerated cellulose, one may employ any of the compounds herein disclosed, and particularly those which have been polyoxyalkylated as described, for example, in Example 24. In this instance, it is preferred to impregnate the regenerated cellulose in the gel state before final drying thereof.

Other variations in and modifications of the described processes which will be obvious to those skilled in the art can be made in this invention without departing from the scope or spirit thereof.

We claim:
1. A compound of the formula:

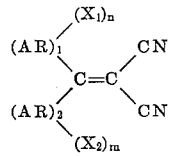

wherein $(AR)_1$ and $(AR)_2$ are benzene nuclei devoid of nitro substituents and nuclear bonded amino groups and wherein $X_1$ and $X_2$ are radicals selected from the group consisting of halogen, cyano, hydroxy, alkoxy, hydroxyalkoxy, carboxyl, carbonamido, carbaloxy, acyloxy, sulfonamido and phenyl, and $n$ and $m$ are integers from 0 to 5, and $n+m$ is at least 1.

2. A compound as defined in claim 1 wherein $X_1$ and $X_2$ are halogen.
3. A compound as defined in claim 1 wherein $X_1$ and $X_2$ are hydroxy.
4. A compound as defined in claim 1 wherein $X_1$ is alkoxy, and $m=0$.
5. A compound as defined in claim 1 wherein $X_1$ is phenyl, and $m=0$.
6. A compound as defined in claim 1 wherein $X_1$ is hydroxyalkoxy, and $m=0$.
7. A compound as defined in claim 1 wherein $X_1$ is acyloxy, and $m=0$.
8. 4,4'-dichlorodiphenylmethylene malononitrile.
9. phenyl - 4 - n - dodecyloxyphenylmethylene malononitrile.
10. 4 - chlorophenyl - 4' - methoxyphenylmethylene malononitrile.
11. phenyl - (4 - methoxyphenyl) - methylene malononitrile.
12. phenyl-(4-biphenyl)-methylene malononitrile.
13. di-(4-hydroxyphenyl)-methylene malonitrile.

References Cited by the Examiner
UNITED STATES PATENTS

| 2,458,017 | 1/1949 | Mowry | 260—465 |
| 2,465,318 | 3/1949 | Seymour | 260—465 |
| 2,683,659 | 7/1954 | Schlesinger | 260—465 |

OTHER REFERENCES

Charles Comptes Rendus, 1956, volume 242, pp. 2468–2469.

CHARLES B. PARKER, *Primary Examiner.*

LEON ZITVER, JOSEPH P. BRUST, *Examiners.*

DALE R. MAHANAND, *Assistant Examiner.*